Figure 1:
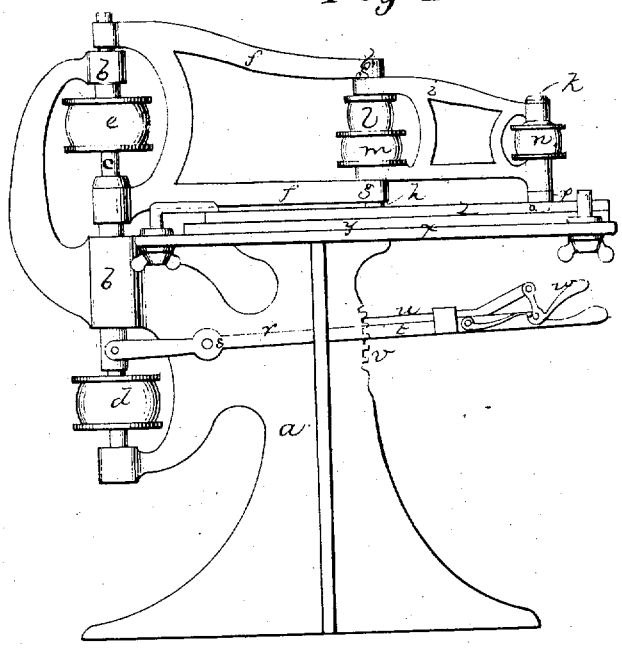

A. S. GEAR.

Improvement in Molding-Machines.

No. 4,885. Reissued April 30, 1872.

Witnesses
M. W. Frothingham.
L. H. Latimer.

Inventor
A. S. Gear,
by his Attys
Crosby & Gould

UNITED STATES PATENT OFFICE.

ALONZO S. GEAR, OF BOSTON, MASSACHUSETTS.

IMPROVEMENT IN MOLDING-MACHINES.

Specification forming part of Letters Patent No. 97,188, dated November 23, 1869; reissue No. 4,885, dated April 30, 1872.

*To all whom it may concern:*

Be it known that I, ALONZO S. GEAR, of Boston, in the county of Suffolk and State of Massachusetts, have invented an Improvement in Molding-Machines; and I do hereby declare that the following, taken in connection with the drawing which accompanies and forms part of this specification, is a description of my invention sufficient to enable those skilled in the art to practice it.

This invention relates to an improvement in molding machines, the object being to recess the surface of the material to be wrought in order to form a panel thereon and at the same time to mold the edge of the recess; and the invention consists in a vertical cutter-spindle, arranged in a jointed frame and attached to the driving-shaft, with carrying-pulleys arranged at the joint, so that the cutter-spindle may have a universal movement over the surface to be wrought, combined with a form or pattern held upon the material to govern the form of the panel. The invention also consists in arranging the compound cutter-frame so as to be raised and lowered and regulated as to height, and in some minor features, which are hereinafter set forth.

Figure 2:
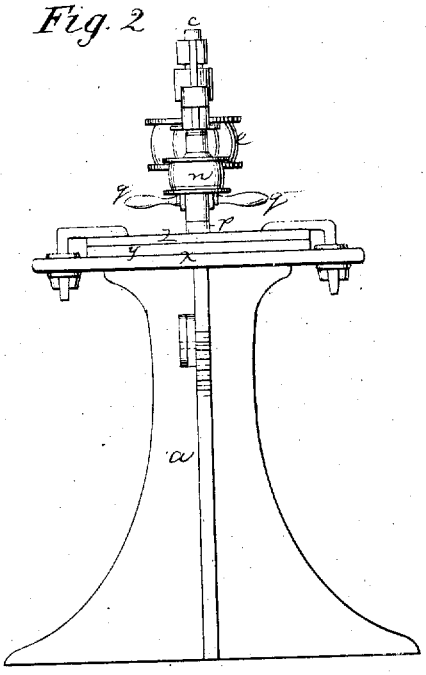
Figure 3:
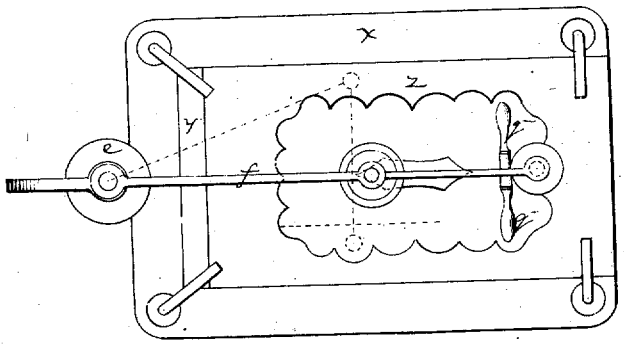
Figure 4:
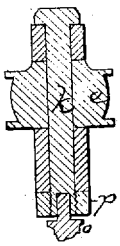

The drawing represents a machine embodying my invention. Figure 1 is a side elevation of the machine; Fig. 2, a front view of it; Fig. 3, a plan. Fig. 4 is a vertical section through the cutter-spindle.

*a* denotes the stand, having at its rear end bearings *b*, in which bearings the vertical driving-shaft *c* is supported and rotates, said shaft carrying a pulley, *d*, by which movement is imparted to the shaft from any suitable power, and a pulley, *e*, for communicating motion from the driving-shaft to the cutter-spindle. Jointed to the shaft *c*, or to a sleeve upon said shaft, is a frame having arms *f f*, the frame swinging loosely upon or with respect to the shaft *c*, and there being at the outer ends of the arms *f f* bearings *g*, in which a vertical shaft, *h*, is journaled and rotates. Jointed to this shaft is another frame, *i*, which swings horizontally on the shaft, said frame *i* having at its front end bearings in which is journaled the vertical cutter-spindle or shaft *k*, the front arm or frame *i* turning upon the shaft *h* as an elbow-joint. Upon the shaft *h* is a pulley, *l*, which is driven by a band from pulley *e* on the driving-shaft, and the shaft *h* has another pulley, *m*, which is connected by a suitable belt with a pulley, *n*, on the cutter-spindle or shaft *k*, this arrangement of the shafts and pulleys enabling the cutter-spindle to move freely in any direction within a radius of the length of the two frames without interrupting the rotation of the cutter-spindle. *o* denotes the cutter fixed in the bottom of the shaft *k*, and above the cutter is a pattern guide-roller, *p*, which is preferably made detachable. The frames and cutter-spindle are made adjustable vertically, for which purpose the shaft *c* is made capable of vertical movement in its bearings, the frame *i* being connected with the shaft so as to be raised and lowered by and with the shaft; and to the lower end of the shaft one end of a lever, *r*, is jointed, said lever being fulcrumed at *s*, and its outer and long arm *t* extending out, as seen in Fig. 1. Upon the arm *t* is a latch, *u*, which is thrown into one of a series of notches, *v*, by the stress of a spring acting directly on a hand-lever, *w*. By depression of this lever the latch is withdrawn from the notch, and by then raising or lowering the lever-arm *t*, the shaft *c*, compound frame, and cutter-spindle are lowered or raised, the cutter being retained at proper height by releasing the hand-lever and letting the latch fly into the proper notch. On the top of the stand *a* a work-supporting table, *x*, may be placed, and upon this table the work *y* to be reduced or wrought. And upon the work the pattern *z* may be laid, as seen in the drawing, the pattern having the interior or exterior form to which the work is to correspond. The pattern, work, and table may be clamped together by suitable hooked dogs and clamp-screws, as seen in the drawing, or by any other suitable means. For convenience of moving the cutter-spindle frame I fix thereto handles *q q*. The operator, when the machine is in motion and properly adjusted, places his hands upon the two handles and moves the cutter within the pattern so as to cut away the surface of the wood, the pattern governing the line of movement around the edge. Patterns are applied whenever any portion of the original surface is to be retained. The guide on the cutter-spindle works against the edge of the pattern, and the cutters are constructed to give whatever form or mold it is desired for the edge. By thus governing the cutters the operator can adapt the movement of the cutter to the nature of the wood which he is cutting. If, having cut one depth, it is desired to cut still another by the same pattern—that is to say, so as to make a "double sink" in the panel—different-sized guides *p* may be applied, one after the other, to accomplish the desired result.

I am aware that a jointed frame with a free swinging end has been used to carry a sand-paper disk; also, that a jointed frame carrying a rotary cutter has been used; but in this case the frame was so arranged that no part of it could swing freely, but the whole was controlled by mechanism; also, that frames have been used capable of swinging in the arc of a circle in connection with a carriage movable under such frame; and also that a rotary tool has been used having no motion other than rotation, except vertical motion, in connection with a movable carriage carrying the work and a pattern, the latter to be kept against a guide fixed to the cutter-frame but not on the cutter-spindle.

In my invention I have combined a free swinging jointed frame, capable of universal horizontal movement, with a rotary chip or shaving-making cutter, in which combination, instead of causing and controlling the movements of the frame by mechanism, I control them by manipulation.

I claim—

1. In combination, the cutter, the vertical rotary spindle, the collar fixed on said spindle adjacent to the cutter and rotating therewith, and the compound frame with freely-swinging end carrying said spindle, and with its opposite end pivoted upon a driving-shaft rotating in fixed bearings, and with the separate parts of the frame pivoted upon and united by an intermediate shaft, all arranged and operating to allow free manipulatory guidance of the collar in contact with the pattern, substantially as and for the purpose specified.

2. In combination with the cutter-spindle mounted in a compound or jointed frame, the table *x* and pattern *z*, the pattern being arranged to surmount the work and clamp it to the table, substantially as shown and described.

3. In combination with the vertically-moving compound cutter-frame the mechanism for adjusting and regulating the height of the swinging cutter, substantially as shown and described.

4. Also, the cutter-spindle *k*, when provided with a screw-thread, for the purpose of securing thereto a series of collars, in combination with the jointed frame and cutter herein described, as and for the purpose specified.

ALONZO S. GEAR.

Witnesses:
LEANDER E. HAZZARD,
LEONARD W. BRADLEY.